United States Patent [19]

Fukunaga et al.

[11] Patent Number: 4,978,847

[45] Date of Patent: Dec. 18, 1990

[54] PULSE GENERATOR AND DISK SECTOR BOUNDARY SIGNAL GENERATOR WITH WOW AND FLUTTER COMPENSATION

[75] Inventors: Seiji Fukunaga, Fujisawa; Takashi Nakamura, Yokohama; Hiroyuki Ono, Fujisawa, all of Japan

[73] Assignee: International Business Machines Corporation, Armonk, N.Y.

[21] Appl. No.: 446,904

[22] Filed: Dec. 6, 1989

[30] Foreign Application Priority Data

Dec. 9, 1988 [JP] Japan .................................. 63-309890

[51] Int. Cl.$^5$ .............................................. G01D 5/34
[52] U.S. Cl. ........................... 250/231.14; 250/237 G; 341/13
[58] Field of Search ....................... 250/231.14, 231.16, 250/237 G; 356/375, 395, 396; 33/707; 341/13

[56] References Cited

U.S. PATENT DOCUMENTS 4,511,797 4/1985 Pohlig et al. .

Primary Examiner—David C. Nelms
Attorney, Agent, or Firm—Robert W. Lahtinen

[57] ABSTRACT

A pulse generator and a disk sector boundary signal generator are implemented using an optical pattern of alternating light and dark radial lines or segments which are adhered to and rotate in unison with the rotor of a motor and are sensed by an optical sensor. The output of the optical sensor includes error conditions including sensor error, pattern error component, the wow component of the motor and the flutter component of the motor. A first pulse generating means eliminates sensor and pattern error components and the flutter component leaving only the wow component of the sensor output. A second pulse generating means that eliminates the higher frequency error components leaving pattern error components, wow components and flutter components, where the system is designed to generate flutter components with a frequency at least ten times the frequency of the wow component. The first pulses serve as disk sector boundary reference pulses. The second pulses, at a higher frequency, between first pulses contain pattern error pulses corresponding to the sector and the final pulse serves as a sector boundary pulse.

6 Claims, 7 Drawing Sheets

PULSE GENERATOR AND DISK SECTOR BOUNDARY SIGNAL GENERATOR WITH WOW AND FLUTTER COMPENSATION

FIELD OF THE INVENTION

The present invention relates to a pulse generator which includes an optical or magnetic pattern provided on a rotor of a motor, a sensor detecting a movement of the pattern due to a rotation of the motor, and which generates pulses following to the rotation of the motor from the output of the sensor and, more particularly to a sector boundary signal generator for a disk such as a magnetic disk.

BACKGROUND OF THE INVENTION

Published Unexamined Japanese patent application (PUPA) No. 59-154630 (154630/84) discloses that an optical recording medium on which recorded clock pulse signals are recorded is fixed in a freely replaceable manner, on a rotary shaft to which a magnetic recording medium is fixed, and the surface of the recording medium is read by a combination of light source and optical sensor to generate clock pulses.

In accordance with this method, signals following the rotational characteristics, that is wow and flutter components, of a motor for driving the rotary shaft can be obtained.

However, if an error occurs in the optical sensor or a recording or mounting error occurs in the optical recording medium when the above-mentioned prior art is applied, an erroneous signal might be issued from the optical sensor It is preferable not to generate sector boundary signals for servo write operations based on such signals.

SUMMARY OF THE INVENTION

One object of the present invention is to provide a pulse generator capable of generating pulses following the rotational characteristics, that is wow and flutter components of a motor even if there are sensor errors or pattern errors (including pattern mounting errors) when an optical or magnetic pattern is provided on a rotor of a motor and a movement of the pattern due to a rotation of the motor is detected through a sensor.

Another object of the present invention is to provide a sector boundary signal generator capable of following only the rotational characteristics, that is wow and flutter components, of a motor used for driving a disk such as a magnetic disk by eliminating sensor errors and pattern errors including pattern setting errors even if there are those errors.

The present invention is based on two principles: one is that a wow component of a motor is distributed over a first frequency band ranging for example from 2 Hz to 6 Hz, a flutter component of the motor and pattern errors are distributed over a second frequency band ranging, for example from 10 Hz to 300 Hz, and pattern errors and sensor errors are distributed over a third frequency band exceeding 300 Hz; the other is that pattern errors have periodicity, whereas the sensor errors have irregularity. In accordance with the present invention the sensor error component, the pattern error component, and the motor flutter component are eliminated from the output of the sensor, the wow component of the motor is left, and first pulses with a frequency of, for example, 1620 Hz are generated, by a first pulse generating means consisting of a phase-locked loop (hereinafter PLL) circuit with its low frequency pass characteristic, with a cutoff frequency of, for example, 10 Hz. The error component of the sensor and the higher frequency error component of the pattern are eliminated from the output of the sensor. The lower frequency error component of the pattern and the wow and flutter components of the motor are left, and second pulses with a higher frequency, for example, 1.05 MHz, than the first pulses in synchronization with only the above remaining components are generated, by a second pulse generating means consisting of a PLL circuit with its low frequency pass characteristic, with a cutoff frequency of, for example, 300 Hz. The second pulses occurring between two succeeding first pulses are counted. Every such count value is stored at every first pulse period. The count value stored is read and a pulse is generated when the same number of the second pulse generated due to a rotation of that part of the pattern which corresponds to said count value are counted as the count value read.

When a disk sector boundary signal generator is constructed in accordance with the present invention, the first pulses serve as sector boundary reference pulses, the second pulses serve as pulses containing a pattern error contained pulses, each period of the first pulses corresponds to each sector, and the pulse finally generated serves as a sector boundary signal.

It has been established that the pattern should be set up with sufficient precision to provide a sensor output having a frequency at least ten times that of the flutter component of the motor when the pattern rotates with the motor. If a less precise pattern, such as the provision of a sensor output with a lower frequency than above, the sector boundary signal generator may not follow the wow and flutter components of the motor.

DETAILED DESCRIPTION

Figure 1:
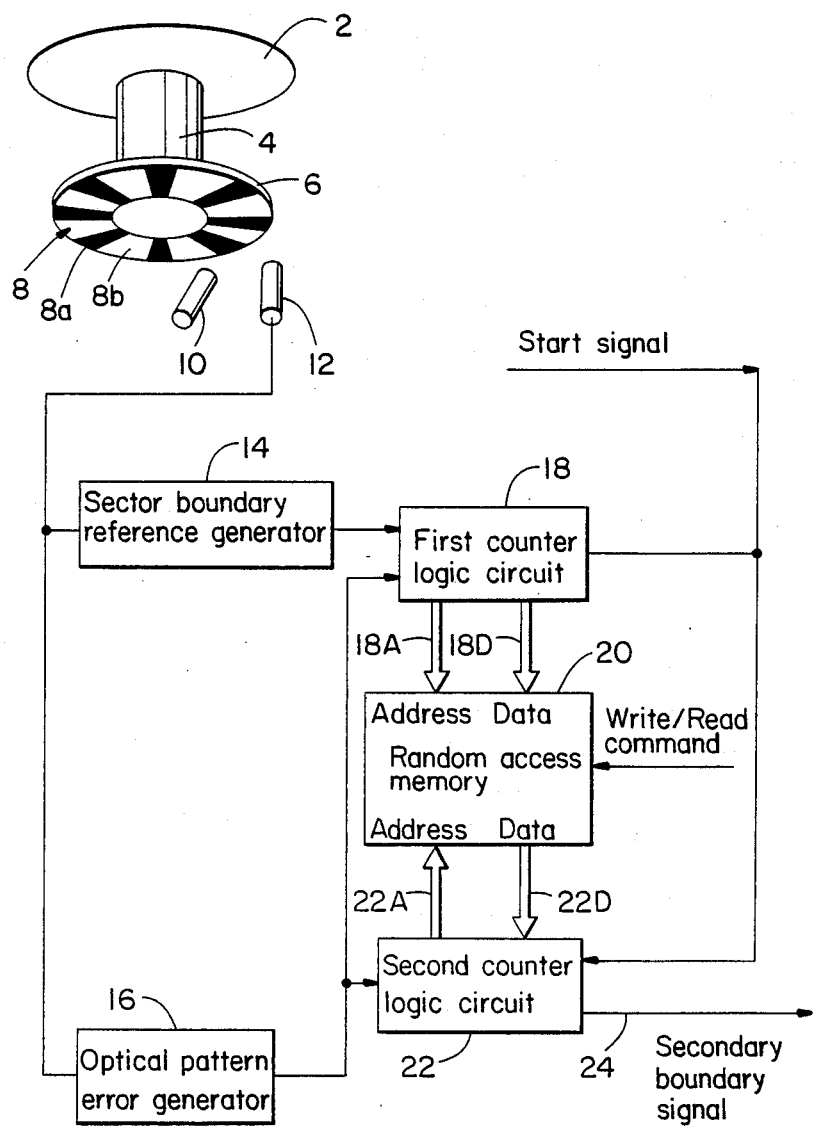
FIG. 1 is a block diagram of the sector boundary signal generator of the present invention.

FIG. 1 shows a magnetic disk sector boundary signal generator as one embodiment of the present invention. Referring now to FIG. 1, an optical pattern label 8 is adhered on a rotor 6 of a spindle motor 4 driving a magnetic disk 2 as shown. Black patterns 8a and white patterns 8b which are extended in the radial direction are alternately printed over the optical pattern label 8.

Light is radiated onto the optical pattern label 8 from a light source 10. Light reflected from the optical pattern label 8 is directed to an optical sensor 12.

Figure 2:
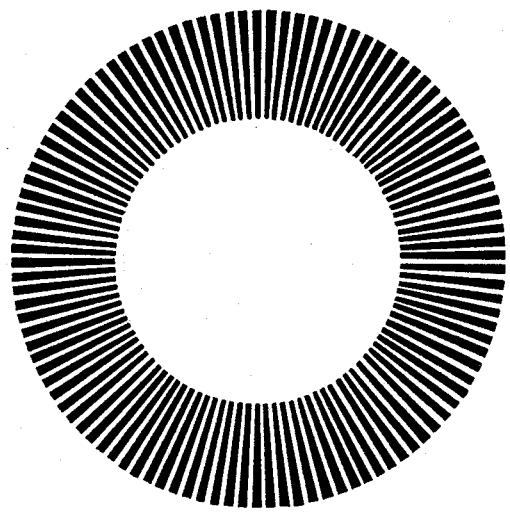
FIG. 2 is a pattern view of an optical pattern label.

Accordingly, the higher the speed of the motor 4 is, the higher the frequency of pulses generated from the optical sensor 12, and the lower the speed of the motor 4, the lower the frequency of pulses outputted from the optical sensor 12. That is, the pulses outputted from the optical sensor 12 represent the rotational characteristics of the motor 4, and thus include the wow and flutter components of the motor 4. The numbers of black patterns 8a and white patterns 8b in the circumferential direction on the label 8 are determined so that the sensor 12 develops an output with a frequency of at least ten times that of the flutter component of the motor 4 when the label 8 rotates with the rotor of motor 4. The output of the sensor 12 can thus follow the wow and flutter components of the motor 4. With a motor rotating at a rotational frequency of 60 cycles per minute, for example, it is adequate to provide about 100 radial segments of black pattern. FIG. 2 shows one example of the optical pattern where 112 radial segments of black pattern are provided in the circumferential direction.

Although it is ideal for the output pulses from the optical sensor 12 to show only the rotational characteristics of the motor 4 including the wow and flutter components of the motor 4, there may arise cases in which the center 8C of the optical pattern label 8 does not coincide with the center 6C of the rotor 6 of the motor 4, or a print error occurs on the optical pattern label 8, in which cases the output of the optical sensor 12 would include some optical pattern errors. Also, a malfunction of the optical sensor 12 would lead to an optical sensor error in the output of the optical sensor 12.

Figure 4:
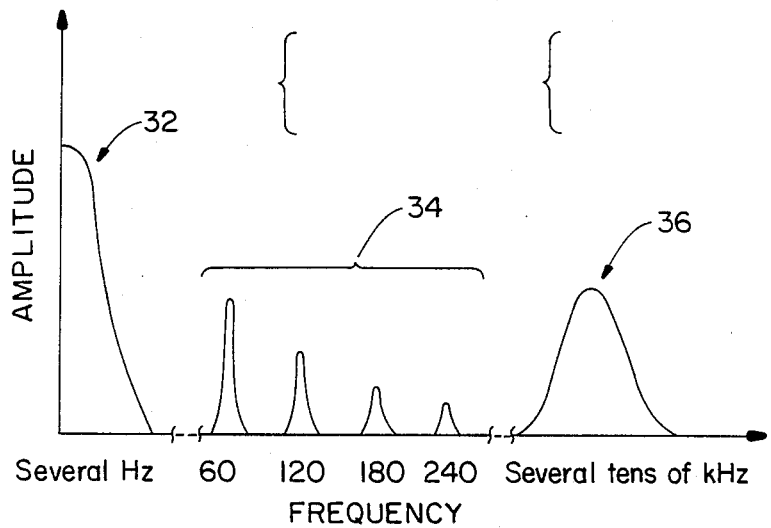
FIG. 4 is a graphic representation of the frequency distribution of each component which is likely to cause fluctuations in optical sensor output.

FIG. 4 shows the frequency distribution of each component to be a possible cause of fluctuations in the output of the optical sensor 12. The first fluctuation component 32 is the wow component of the motor 4, which is distributed over the frequency band of 2 Hz to 6 Hz. The wow component of the motor 4 takes place irregularly. The second fluctuation component 34 consists of the flutter component of the motor 4 and the optical pattern error component of the optical pattern label 8, which is distributed over the frequency band of 10 Hz to 300 Hz. The flutter component of the motor 4 takes place irregularly, whereas the optical pattern error component takes place periodically. The third fluctuation component 36 consists of the optical pattern error component of the optical pattern label 8 and the error component of the optical sensor 12, which is distributed over a frequency band higher than 300 Hz. The optical pattern error component takes place periodically, whereas the optical error component occurs irregularly.

Figure 5:
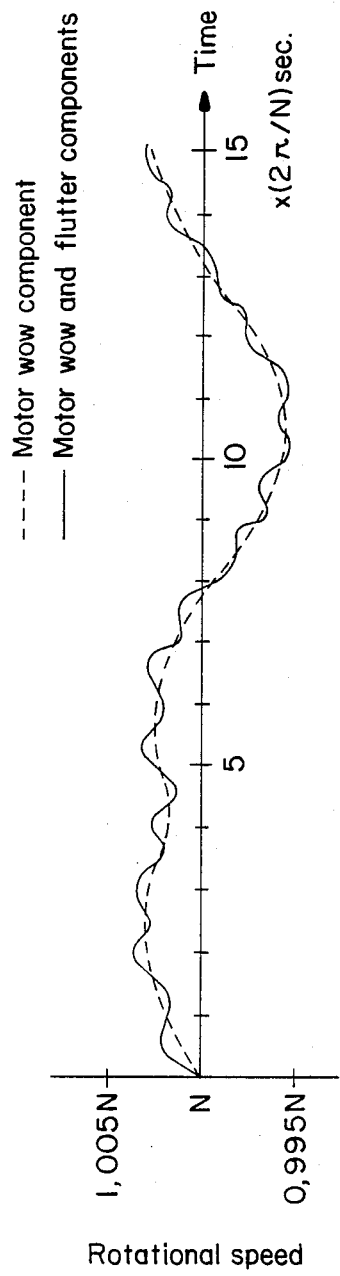
FIG. 5 is a graphic representation of fluctuations in the rotational speed of the motor which are attributable to the wow and flutter of the motor.

FIG. 5 shows fluctuations in the rotational speed of the motor 4 due to the wow and flutter of the motor 4. Also, in FIG. 5. assuming the average rotational speed of the motor 4 to be N rad/s, the wow represents a slower rotational fluctuation observed over several revolutions to several ten revolutions of the motor 4, whereas the flutter represents a quicker fluctuation taking place in one revolution of the motor 4. As described above, the wow and flutter are aperiodic.

Figure 3:
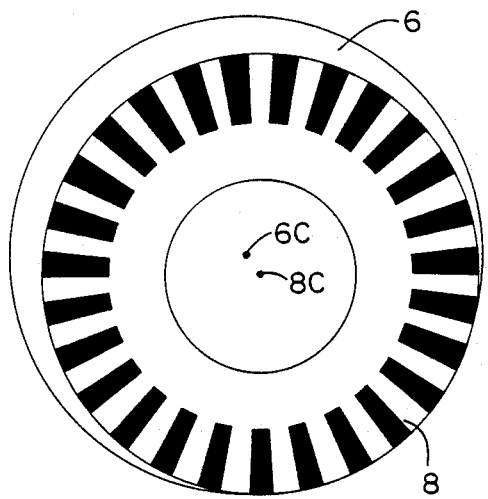
FIG. 3 is an explanatory view of the optical label attachment error which is likely to lead to an optical pattern error component.

The sector boundary signal generator shown in FIG. 1 is designed to generate sector boundary signals including the wow and flutter components of the motor 4, but neither optical pattern error component nor optical sensor error component. The sector boundary reference generator 14, consisting of a PLL circuit, with low pass frequency characteristics of a 10 Hz cutoff frequency generates 1620-Hz sector boundary reference pulses synchronous with the only wow component of the motor 4, by eliminating from the output of the optical sensor 12 the error component of the sensor, i.e. the third fluctuation component 36 of the optical sensor shown in FIG. 3, the error component of the optical pattern, i.e. the second and third fluctuation components 34 and 36 of the optical sensor shown in FIG. 3, and the flutter component of the motor, i.e. the second fluctuation component 34 of the optical sensor shown in FIG. 3. and leaving uneliminated the wow component of the motor 4, i.e. the first fluctuation component 32 shown in FIG. 3.

The optical pattern error generator 16, consisting of a PLL circuit with low pass characteristics of 300 Hz cutoff frequency, eliminates from the output of the optical sensor 12 the error component of the sensor and the higher frequency error component of the optical pattern, i.e. the third fluctuation component 36 of the optical sensor shown in FIG. 4; leaves uneliminated the lower frequency error component of the optical pattern and the flutter component of the motor 4, i.e. the second fluctuation component 34 of the optical sensor shown in FIG. 4, and the wow component of the motor 4, i.e. the first fluctuation component 32 of the optical sensor shown in FIG. 4; and thus generates a 1.05-MHz optical pattern error contained pulses synchronous with only those remaining components, i.e. the wow and flutter components of the motor 4 and the lower frequency error component of the optical pattern.

Figure 6:
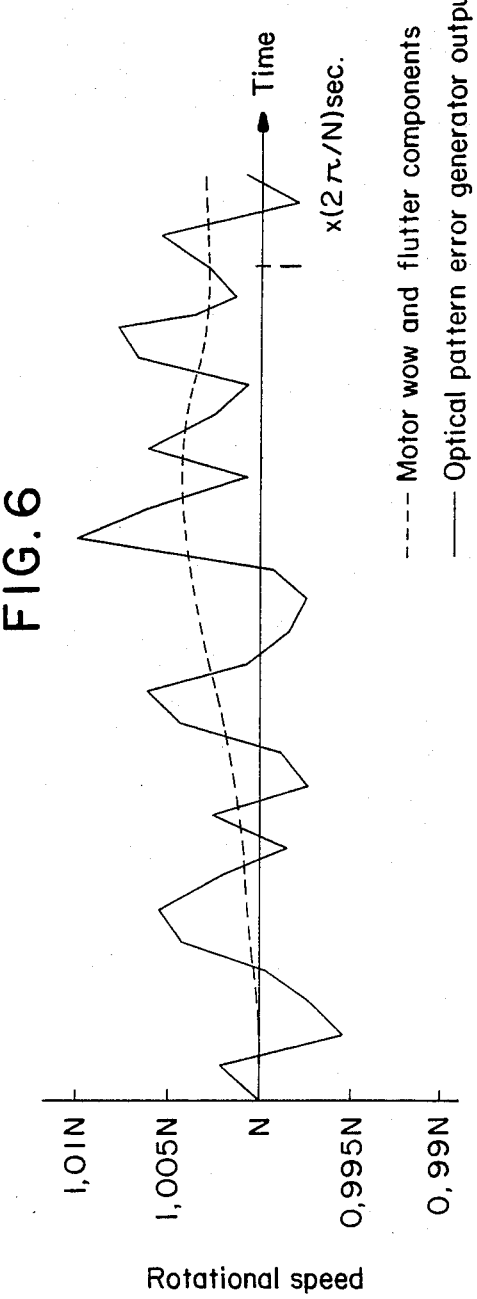
FIG. 6 is a graphic representation of the output of the optical pattern error generator in terms of rotational frequencies.

FIG. 6 shows an example of the output of the optical pattern error generator 16 in terms of revolution number. As is evident from this figure, the output of the optical pattern error generator 16 is the sum of the aperiodic wow and flutter components of the motor 4 and a certain periodic optical pattern error component.

The first counter logic circuit 18 is put into operation by a start signal issued when the magnetic disk 2 starts from its initial position, receives the output of the sector boundary reference generator 14 and the output of the optical pattern error generator 16, and counts optical pattern error component contained pulses which are issued from the optical pattern error generator 16 in the interval between two successive sector boundary reference pulses. As specifically described the first counter logic circuit 18 receives a first sector boundary reference pulse from the sector boundary reference generator 14, the logic circuit 18 issues a signal indicative of the first sector to the address line 18A and starts counting optical pattern error component contained pulses. When the circuit 18 receives a second sector reference pulse from the sector boundary reference generator 14, the circuit 18 stops counting the optical pattern error component contained pulses and sends the resultant count value to a data line 18D. Then the first counter logic circuit 18 switches the signal to the address line, 18A from the signal indicative of the first sector to a signal indicative of the second sector, and resumes the counting of optical pattern error component contained pulses. When the circuit 18 receives a third sector reference pulse from the sector boundary generator 14, the circuit 18 stops counting optical pulse error component contained pulses and sends the resultant count value to the data line 18D. The first counter logic circuit 18 repeats such counting operations until the final sector, and sends the resultant count values of optical pattern error component contained pulses for the respective sectors along with their relevant values indicative of those sectors through the data lines 18D and 18A to the random access memory 20. Thus, the memory 20 contains only a certain value which is indicative of the wow and flutter components and the the lower frequency error component of the optical pattern minus the wow component of the motor 4, that is, a value reflecting only the flutter component of the motor 4 and the lower frequency error component of the optical pattern.

In an example where the number of sectors is 27, the count value of the optical pattern error component contained pulses may be 648 unless there is an optical pattern error, or otherwise a value falling between 640 and 655, for example, if there is an optical pattern error.

The random access memory 20 when a write command is received, from outside, receives signals indicative of a particular sector and the count value of the optical pattern error contained pulses from the first counter logic circuit 18 through the address line 18A and the data line 18D, and stores at every sector the count value of the corresponding optical pattern error contained pulses. When the count value of the optical pattern error component contained pulses have been stored for all sectors, for example 27 sectors, a read command is issued from outside to the random access memory 20, instead of the write command.

The second counter logic circuit 22 begins its operation with a start signal given when the magnetic disk 2 begins to move from its initial position, issues a signal indicative of the first sector though the address line 22A to the random access memory 20, reads the count value of the optical pattern error component contained pulses for the first sector which is stored in the memory 20 and presets itself to that count. Then the count value of the second counter logic circuit 22 is decreased each time an optical pattern error component contained pulse arrives which is generated from the optical pattern error generator 16 due to a rotation of that part of the optical pattern 8 which corresponds to the first sector of the magnetic disk 2, and issues a sector boundary signal indicative of the boundary between first sector and second sector when the count value of the circuit 22 reaches zero.

As described above, the optical pattern error component containing pulses normally include not only the wow and flutter components of the motor 4, but also a certain optical pattern error component. Because the wow and flutter components of the motor 4 are of irregular occurrence, whereas the optical pattern error component has periodicity the optical pattern error component can be eliminated from the sector boundary signal if sector boundary signals are generated by counting the optical pattern error component containing pulses generated from the optical pattern error generator 16 due to a new rotation of that part of the optical pattern 8 which corresponds to the first sector of the magnetic disk 2 by the number of the optical pattern error component contained pulses generated from the optical pattern error generator 16 due to the previous rotation of that part of the optical pattern 8 which corresponds to the first sector of the magnetic disk 2. Also, the output of the first counter logic circuit 18 stored in the random access memory 20 includes not only an optical pattern error but also a flutter component. However, as shown in FIG. 6, since the flutter component is very small in comparison with the optical pattern error, it is permissible to include the flutter component in the optical pattern error. i.e., the repetitive error.

For example, if the frequency of the optical pattern error component containing pulses becomes higher in the first sector because of an optical pattern error, the count value of the first counter logic circuit 18 is incremented. The second counter logic circuit 16, however, counts the optical pattern error component contained pulses with the same higher frequency by the count value counted by the first counter logic circuit 18. Therefore, the time taken for the circuit 16 to count one pulse becomes shorter, and hence the optical pattern error has no effect on the time taken to count the optical pattern error component contained pulses over the first sector. Thus, the sector boundary signal issued by the second counter logic circuit 16 includes the wow and flutter components of the motor 4, but includes neither the optical pattern error component nor the optical sensor error component.

The second counter logic circuit 22, after issuing a signal indicative of the boundary between the first sector and the second sector, issues a signal indicative of the second sector to the address line 22A, reads and presets itself the count value of the optical pattern error component contained pulses for the second sector, decrements the count value each time an optical pattern error component contained pulse arrives from the optical pattern error generator 16 due to a rotation of that part of the optical pattern 8 corresponding to the second sector of the magnetic disk 2, and generates a sector boundary signal indicative of the boundary between the second sector and the third sector.

Likewise, the second counter logic circuit 22 reads from the random access memory 20 the count value of the optical pattern error component containing pulses for every sector, counts optical pattern error component contained pulses generated by the optical error pattern generator 16, due to a rotation of the part of optical pattern 8 corresponding to the sector being processed by the count value read above, generates each sector boundary signal, outputs all sector boundary signals, and terminates the operation.

Figure 7:
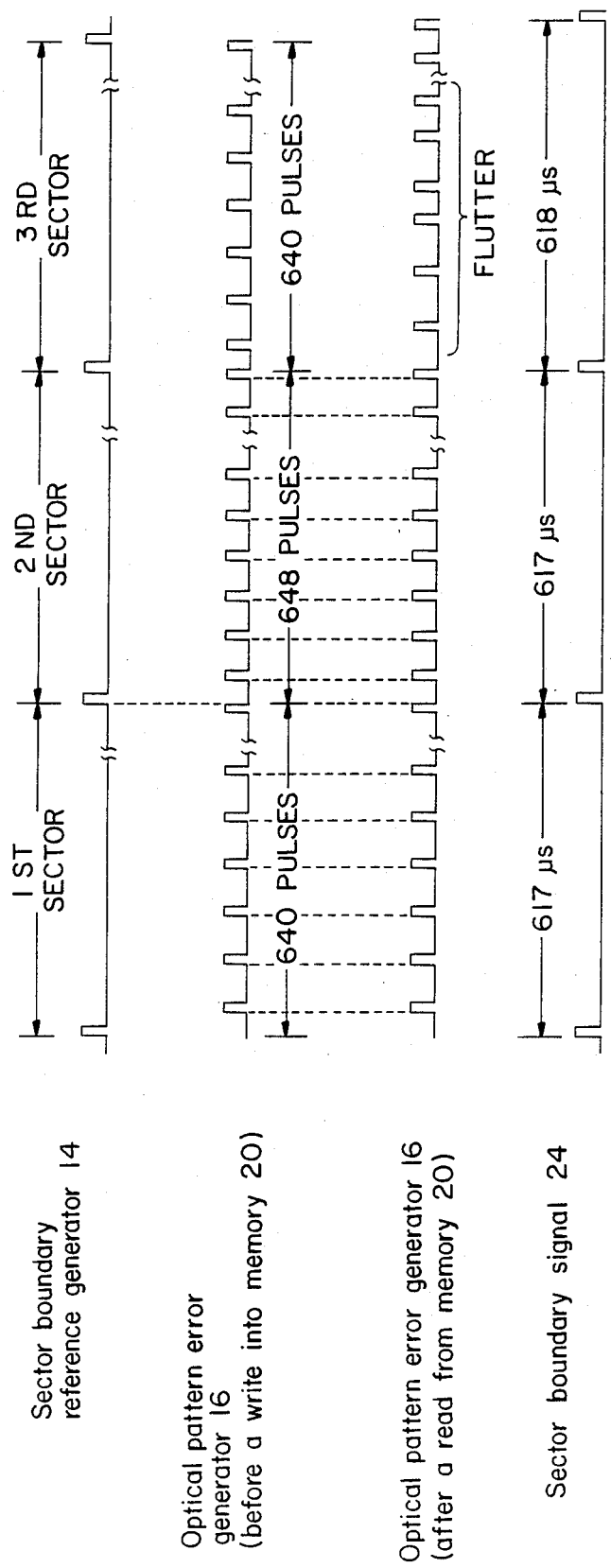
FIG. 7 is a timing chart of the operations of the sector boundary signal generator of FIG. 1.

FIG. 7 is a timing chart of the operation of the sector boundary signal generator shown in FIG. 1 when there is a flutter in the motor 4 and an error in the optical pattern. We assume here the following conditions: the frequency of pulses from the optical sensor 12 and the optical pattern error generator 16 becomes lower because an optical pattern error occurs in the first sector; in the second sector, neither optical pattern error nor flutter in the motor 4 occurs, the frequencies of the pulses from the optical sensor 12 and optical pattern error generator 16 each indicate a nominal value, and the period of those pulses is constant within the sector. Because there is the same optical pattern error in the third sector as in the first sector, the frequencies of pulses from the optical sensor 12 and the optical pattern error generator 16 become lower, and the period of said output pulses varies because a flutter component exists in the motor 4.

Thus, since there is an optical pattern error in the first sector, the count outputted from the first counter logic circuit 18 is 640, which is smaller than the counter value 648 outputted in the second sector which is free from any optical pattern error. However, since the optical pattern error has periodicity, the pulse pattern outputted from the optical sensor 12 and the optical pattern error generator 16 in the first and second sectors during a certain rotation of the magnetic disk 2 agree with the pulse pattern which the optical sensor 12 and the optical pattern error generator 16 output in the first and second sectors during another rotation of the magnetic disk 2, unless a flutter occurs in the motor 4. The period of pulses issued in the first sector by the optical pattern error generator 16 is always 648/640 times the period of pulses issued in the second sector by the optical pattern error generator 16. Accordingly, the time for the second counter logic circuit 22 to count the output pulses from the optical pattern error generator 16 in the first sector during a particular rotation of the magnetic disk 2 by the count value of the output pulses from the optical pattern error generator 16 in the first sector during the previous rotation of the magnetic disk 2 is the same as the time for the second counter logic circuit 22 to count the output pulses from the optical pattern error generator 16 in the second sector during a particular rotation of the magnetic disk 2 by the count value of the output pulses from the optical pattern error generator 16 in the second sector during the previous rotation of the magnetic disk 2. (In the example of FIG. 4, the time is 617 micro seconds.) The optical pattern error is thus eliminated.

In the third sector, there occurs not only an optical pattern error, but also a fluttering in the motor 4. Any such optical pattern error could easily be eliminated because of its periodicity, as described above, whereas since the flutter of the motor 4 is irregular, the counting time of the second counter logic circuit 22 varies with the state of flutter. FIG. 7 shows a case where the second counter logic circuit 22 takes a relatively long time of 618 microseconds to generate a sector boundary signal because of the flutter of the motor 4.

Figure 8:
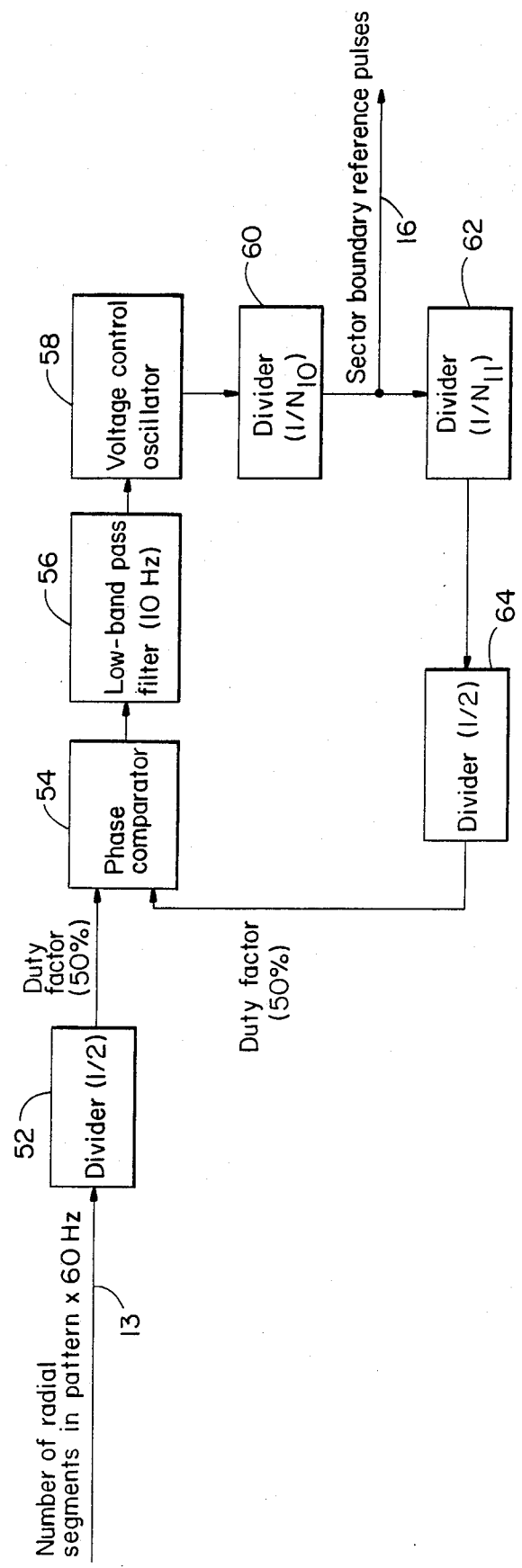
FIG. 8 is a block diagram of a construction example of the sector boundary reference generator of FIG. 1.

FIG. 8 shows one example of a specific structure of the sector boundary reference generator 14, which consists of a PLL circuit. In FIG. 8, a phase comparator 54 compares the output of the optical sensor 12 provided through a line 13 and a ½ frequency divider 52, with the output from a ½ frequency divider 64 of a feedback circuit in terms of their phases by exclusive-OR the output of the sensor 12 and the output of the ½ frequency divider 64, and outputs the phasal difference between the above two outputs to a low pass filter 56. The low pass filter 56, which has a cutoff frequency of 10 Hz, smooths the output of the phase comparator 54 and sends the resultant output to a voltage control oscillator 58. The voltage control oscillator 58 changes its frequency according to an output voltages of the low pass filter 56. The cutoff frequency of the low pass filter 56 corresponds to said smoothness: that is, the higher the cutoff frequency becomes, the less the smoothness becomes. The cut off frequency of the filter 56 changes the output frequencies of the voltage control oscillator 58. The output of the voltage control oscillator 58 is frequency-divided by a $1/N_{10}$ frequency divider 60 and $1/N_{11}$ frequency divider 62, each consisting of a loop counter, then be fed back to the phase comparator 54 through the ½ divider 64.

Provided that $N_1 = N_{10} \times N_{11}$, the central output frequency of the voltage control oscillator 58 is $N_1$ times that of the optical sensor 12. Accordingly, if the cutoff frequency of the low band pass filter 56 is set at 10 Hz, for example, so that the filter 56 should pass only the frequency band covering the wow component of the motor, fluctuations in the oscillation frequency of the voltage control oscillator 58 reflect only the wow component of those in the output of the optical sensor 12.

The ½ dividers 52 and 64 are provided so that the two inputs to the phase comparator 54 should be 50% in duty factor.

Figure 9:
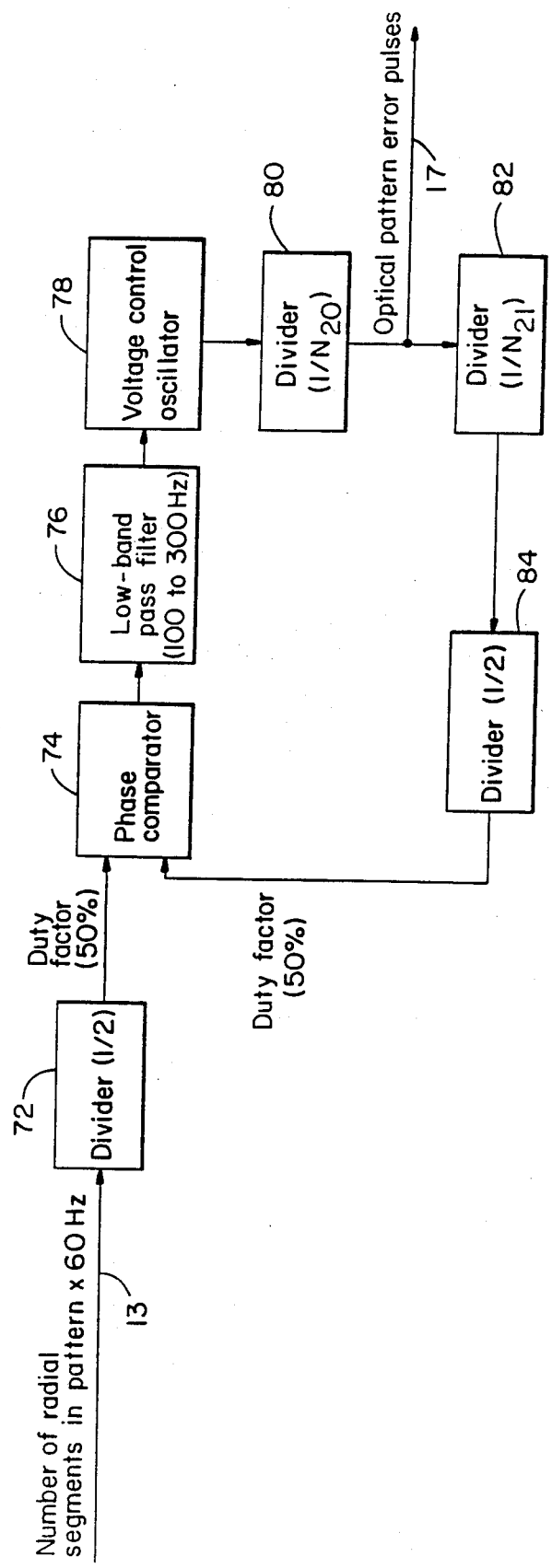
FIG. 9 is a block diagram of a construction example of the optical pattern error generator of FIG. 1.

FIG. 9 is one example of a specific construction of the optical pattern error generator 16, which consists of a PLL circuit. In FIG. 9, a ½ frequency divider 72, a phase comparator 74, a low pass filter 76 9 voltage control oscillator 78, a $1/N_{20}$ frequency divider 80, a $1/N_{21}$ frequency divider 82, and a ½ frequency divider 84 correspond to the ½ divider 52, the phase comparator 54, the low pass filter 56, the voltage control oscillator 58, the $1/N_{10}$ divider 60, the $1/N_{11}$ divider 62, and the ½ divider 64, respectively. The construction in FIG. 9 is distinguished from the construction in FIG. 8 only in that the cutoff frequency of the low pass filter 76 in FIG. 9 is set at 100 Hz to 300 Hz so that the filter 76 passes both the wow component and the flutter component of the motor, and that the frequency dividing ratios $N_{20}$ and $N_{21}$ of the dividers 80 and 82 are different from the frequency dividing ratios $N_{10}$ and $N_{11}$ of the dividers 60 and 62.

Although in the above-mentioned embodiment the sector boundary reference generator 14 and the optical pattern error generator 16 consist of PLL circuits, the present invention is not limited to this embodiment and frequency modulators and frequency demodulators can also be used, because an output wave from the sensor may be regarded as a result of frequency-modulating a certain fluctuation component on carriers given as the product of the revolution number of the motor and the number of radial optical pattern segments. Specifically stated, that sensor output is frequency-demodulated, its error component is eliminated by the above-mentioned low pass filter and memory, and the resultant signal is frequency-modulated to generate sector boundary signals, a function similar to the PLL circuits. In other words, the sector boundary reference generator 14 may be of any construction as long as it can fulfil the following functions: on receiving the output of the optical sensor 12, the sector boundary reference generator 14 eliminates from that output the error component of the optical sensor 12, the error component of the optical pattern, and the flutter component of the motor, leaves the wow component of the motor 4 uneliminated, and generates pulses synchronized with the wow component with a frequency corresponding to a particular sector number on the magnetic disk 2. Likewise, the optical pattern error generator 16 may be of any construction if it can fulfill the following functions: on receiving the output of the optical sensor 12, the optical pattern error generator 16 eliminates from that output the error component of the optical sensor 12 and the higher frequency error component of the optical pattern, leaves uneliminated the lower frequency error component of the optical pattern and the flutter and wow components of the motor, and generates pulses with a frequency higher than that of those sector boundary reference pulses in synchronization with the remaining components.

Although the above-mentioned embodiment relates to magnetic disks, it is also applicable to other types of disks, such as optical disks.

Moreover, the present invention is not limited in scope to generation of disk sector boundary signals, but is also widely applicable to any devices that detect through an optical sensor the movement of optical patterns with the rotation of a motor and generate pulses from the output of the sensor corresponding to the rotation of the motor.

Furthermore, such patterns are not limited to labels on which black and white segments are printed, but may be anything that provides signals indicative of the rotation of a motor, such as magnetic patterns whose state of magnetization inverts alternately along the circumference. Optical sensors may be used to read magnetic patterns written on a magnetic optical disk, whereas magnetic sensors are usually used to read magnetic patterns. However, it is more convenient and advantageous particularly in respect of cost, to apply optical pattern labels.

As evident from the above description, the present invention enables sensor error components and pattern error components to be eliminated, and also pulse signals, such as sector boundary signals, to be generated following the wow and flutter components of a motor.

We claim:

1. A pulse generator associated with the rotor of a motor
    comprising
    a pattern provided on the rotor of the motor which rotates in unison with the rotor;
    a pattern sensor which detects movement of said pattern due to rotation of the rotor and generates pulses from the sensor output following rotor rotation;
    said pattern being set to provide a sensor output with a frequency not less than ten times the frequency of a flutter component developed as said pattern rotates with said rotor;
    a first pulse generating means for receiving the output of said sensor, eliminating from said output an error component of said sensor, an error component of said pattern, and the flutter component of said motor, leaving uneliminated a wow component of said motor, to generate first pulses with a predetermined frequency in synchronization with only the wow component of said motor;
    a second pulse generating means for receiving the output of said sensor eliminating from said output the error component of said sensor and a higher frequency error component of said pattern, leaving uneliminated a lower frequency error component of said pattern and the wow and flutter components of said motor, to generate second pulses with a frequency higher than the frequency of said first pulses in synchronization with the lower frequency error component of said pattern and the wow and flutter components of said motor;
    a first counting means for counting said second pulses generated by said second pulse generating means in the interval between two successive first pulses issued by said first pulse generating means;
    a storage means for storing a counter value issued by said first counting means at every pulse period of said first pulse generating means;
    a second counting means for reading said counter value stored in said storage means to generate a pulse when said second counting means counts the same number of second pulses outputted from said second pulse generating means due to a rotation of that part of said pattern corresponding to said read counter value as said read counter value.

2. The pulse generator of claim 1 wherein said motor drives the spindle of a disk storage device upon which are mounted a plurality of data storage disks and said pattern rotates in unison with said disks.

3. The pulse generator of claim 2 wherein said pattern is a sequence of radially extending alternating dark and light segments and said pattern sensor is an optical sensor.

4. A sector boundary signal generator which includes a pattern provided on a rotor of a motor and which rotates in unison with said motor and is set to provide an output frequency not less than ten times the frequency of the flutter component of said motor as the pattern rotates with said rotor, and a pattern sensor detecting a movement of said pattern due to a rotation of said motor, and which generates signals indicative of sector boundaries of a disk from an output of said sensor, comprising:
    a sector boundary reference generating means for receiving the output of said sensor, eliminating from said output an error component of said sensor, an error component of said pattern, and the flutter component of said motor, leaving uneliminated a wow component of said motor, to generate sector boundary reference pulses with a frequency corresponding to a sector number of said disk in synchronization with only the wow component of said motor;
    a pattern error generating means for receiving the output of said sensor, eliminating from said output the error component of said sensor and a higher frequency error component of said pattern, leaving uneliminated a lower frequency error component of said pattern and the wow and flutter components of said motor to generate pattern error component contained pulses with a frequency higher than the frequency of said sector boundary reference pulses in synchronization with the lower frequency error component of said pattern and the wow and flutter components of said motor;
    a first counting means for counting said pattern error component contained pulses generated by said pattern error generating means in the interval between two successive sector boundary reference pulses issued by said sector boundary reference generating means to output a counting value of said pattern error component contained pulses at every sector;
    a storage means for storing at each sector said counting value of said pattern error component contained pulses issued by said first counting means; and
    a second counting means for reading said counting value of said pattern error component contained pulses from said storage means at each sector to generate a sector boundary indicating pulse when said second counting means counts the same number of said pattern error component contained pulses generated due to a rotation of that portion corresponding to said sector in process as said read counting value.

5. The sector boundary signal generator of claim 4 wherein said motor drives said disk as a part of a data storage device and said pattern rotates in unison with said disk.

6. The sector boundary signal generator of claim 5 wherein said pattern is a sequence of radially extending alternating dark and light segments and said pattern sensor is an optical sensor.

* * * * *